United States Patent
O'Byrne et al.

(10) Patent No.: US 8,064,764 B2
(45) Date of Patent: Nov. 22, 2011

(54) OPTICAL NETWORK TERMINAL AGENT

(75) Inventors: Vincent A. O'Byrne, Boston, MA (US); Brian Whitton, Ridgefield, CT (US)

(73) Assignee: Verizon Services Organization Inc., Irving, TX (US)

( * ) Notice: Subject to any disclaimer, the term of this patent is extended or adjusted under 35 U.S.C. 154(b) by 1207 days.

(21) Appl. No.: 11/609,671

(22) Filed: Dec. 12, 2006

(65) Prior Publication Data

US 2008/0138064 A1  Jun. 12, 2008

(51) Int. Cl.
*H04B 10/08* (2006.01)
(52) U.S. Cl. ............... 398/25; 398/9; 398/15; 398/17; 398/36
(58) Field of Classification Search ............ 398/9, 25, 398/34, 17, 33, 38, 71, 10, 15, 35, 36; 370/321, 370/432, 241, 242
See application file for complete search history.

(56) References Cited

U.S. PATENT DOCUMENTS

| | | | | |
|---|---|---|---|---|
| 6,140,920 A * | 10/2000 | Roberts | | 340/514 |
| 6,778,781 B2 * | 8/2004 | Van Eijk et al. | | 398/100 |
| 7,391,972 B2 * | 6/2008 | Bernard et al. | | 398/63 |
| 7,424,221 B2 * | 9/2008 | Emery et al. | | 398/38 |
| 7,468,958 B2 * | 12/2008 | Emery et al. | | 370/321 |
| 7,609,967 B2 * | 10/2009 | Hochbaum et al. | | 398/67 |
| 7,778,543 B2 * | 8/2010 | Ferguson et al. | | 398/15 |
| 7,925,156 B2 * | 4/2011 | Weber et al. | | 398/25 |
| 2006/0093356 A1 * | 5/2006 | Vereen et al. | | 398/33 |
| 2007/0116466 A1 * | 5/2007 | Gewirtzman et al. | | 398/71 |
| 2007/0143645 A1 * | 6/2007 | Haran | | 714/704 |
| 2007/0230958 A1 * | 10/2007 | Jiang et al. | | 398/72 |
| 2007/0237523 A1 * | 10/2007 | Miguel et al. | | 398/71 |
| 2007/0274719 A1 * | 11/2007 | Ferguson et al. | | 398/66 |
| 2008/0002718 A1 * | 1/2008 | Bernard et al. | | 370/395.51 |
| 2008/0044177 A1 * | 2/2008 | Huang et al. | | 398/15 |
| 2008/0056719 A1 * | 3/2008 | Bernard et al. | | 398/71 |

* cited by examiner

*Primary Examiner* — Kenneth N Vanderpuye
*Assistant Examiner* — Hibret Woldekidan

(57) ABSTRACT

A method is provided including the steps of monitoring at least one performance metric of at least one network component in an optical network system, determining whether the at least one network component is a rogue network component using the at least one performance metric, saving environment data to a non-volatile storage medium, and modifying the operation of the rogue network component to reduce interference of the rogue network component with the optical network system. In another embodiment, a method includes detecting a condition of a network component in an optical network system, and writing environment data of the network component to a non-volatile storage medium.

25 Claims, 11 Drawing Sheets

OPTICAL NETWORK TERMINAL AGENT

BACKGROUND INFORMATION

Optical networking transport systems typically use an optical line terminal (OLT) that provides a high bandwidth passive optical network (PON). The PON is split, using an optical splitter, to multiple optical network termination (ONT) points. The use of, for example, thirty two (32) ONTs allows multiple users to share the same high bandwidth OLT. However, the number of ONTs may be expanded to up to one hundred and twenty eight (128) in some implementations In use, the OLT and ONTs communicate with the PON using a time division multiplexing (TDM) scheme to allow for each ONT to communicate in an orderly fashion. The use of the optical splitter allows each ONT to share the same OLT and share the costs for the PON system. The TDM scheme is a method for transmitting multiple channels over the single PON line. Each ONT is assigned a periodic timeslot to receive and transmit to the OLT. Thus, there are two slots available to an ONT that include a downstream slot and an upstream slot. Where a packet is too large for a single timeslot, the packet is subdivided and periodically transmitted over a number of the assigned timeslots.

Existing systems have drawbacks wherein ONTs may malfunction and interfere with the timeslots of ONTs on upstream communication. In these cases, the malfunctioning ONT is considered a rogue ONT. The rogue ONT may interfere with upstream communications in a number of ways. For example, a rogue ONT may have timing or synchronization problems wherein an upstream communication is transmitted in the assigned time of another ONT in the TDM scheme. Further, an ONT may overload the OLT with too much optical power. The overload may occur in its own TDM timeslot or in adjacent timeslots. The result of the overload, may include, for example, either an inability for the OLT to receive the desired signal or an interference with other ONTs. This is especially an issue where the rogue ONT is optically close to the OLT, while the ONT with the desired signal is at the edge of the supported distance or optical budget. Additionally, the rogue ONT may confuse the PON to such an extent that a majority of the processing power of the PON is consumed and regular communication with the ONTs is interrupted.

Accordingly, it is highly desirable to be able to detect and correct the operation of a rogue ONT. Further, it is desirable to determine the nature of the faults for a rogue ONT and either correct the problem or disable the offending rogue ONT. Additionally, it is highly desirable to perform these detection and correction functions remotely.

DETAILED DESCRIPTION OF THE PREFERRED EMBODIMENTS

Figure 1:
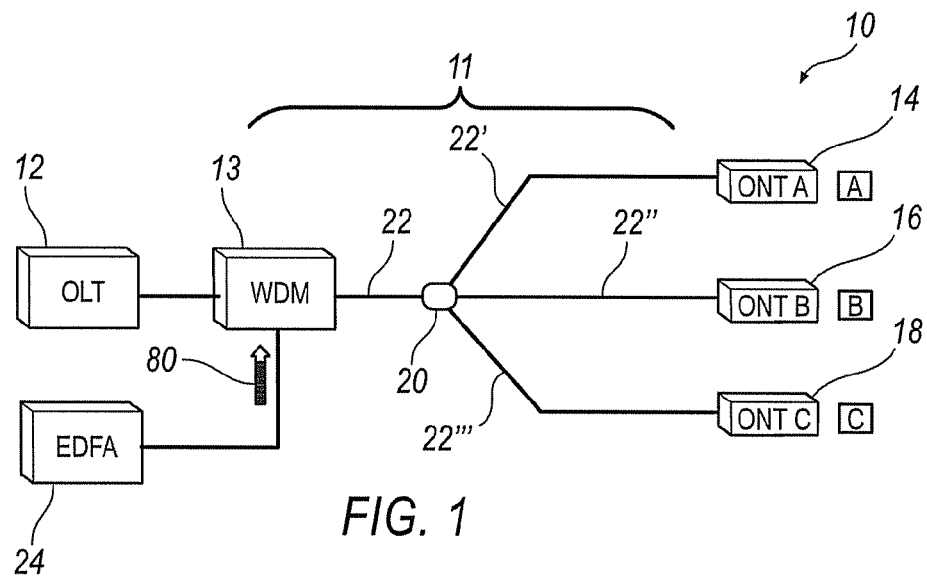
FIG. 1 illustrates a system diagram of a communication system, according to an embodiment.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

The systems and methods described herein use an agent(s) to determine whether or not a network component is malfunctioning or otherwise causing performance degradation of a communication system. The agent(s), e.g., a hardware detector, a software process, monitor internal features and/or external features of network components to detect malfunctions and to determine whether a rogue network component exists. Based on a determination that a rogue network component exists, the agent may take action and command the rogue ONT to take a corrective action.

Overview

FIG. 1 is a system diagram of a communication system 10 for a passive optical network 11 (PON) having an optical line terminal (OLT) 12, a first optical network terminal (ONT) 14, a second ONT 16, a third ONT 18, a splitter 20, an optical path 22 (typically an optical fiber communication channel), an amplifier 24, and a wavelength division multiplexer 13 (WDM). OLT 12 provides a high-bandwidth optical interface for optical path 22 and the subsequent ONTs 14, 16, 18 connect to optical path 22. Although only three ONTs are described herein by way of example, there may be more ONTs assigned to downstream channel, as is known in the art. The connection to optical path 22 is made for each ONT 14 by way of splitter 20. Splitter 20 is an optical splitter that provides multiple optical paths 22', 22", 22''' to each ONT 14, 16, 18 respectively. Amplifier 24 sends signals to OLT 12 and ONTs 14, 16, 18 using an out-of-band signal. This out-of-band signal uses a wavelength not used by the IP data stream. WDM 13 combines downstream signals from OLT 12 and EDFA 24, each having different wavelengths, onto optical path 22.

Figure 2:
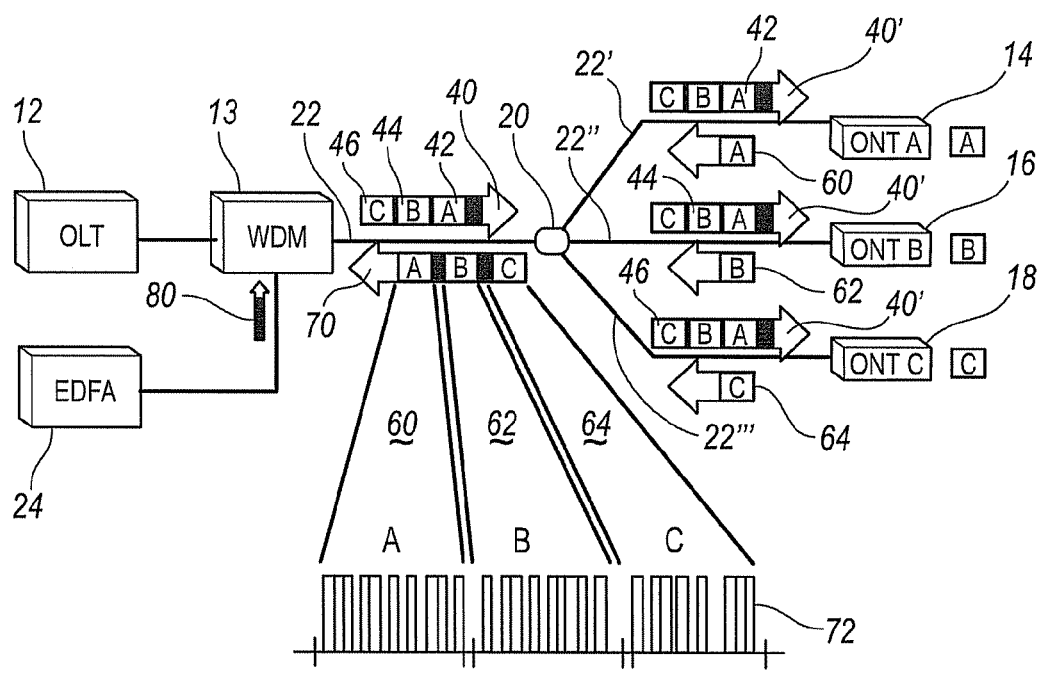
FIG. 2 illustrates a system diagram of a time division multiplexing (TDM) scheme for use with the communication system of FIG. 1, according to an embodiment.

FIG. 2 is a system diagram of a time division multiplexing (TDM) scheme for use with communication system 10. A downstream TDM channel 40 includes a first time-slot 42 for first ONT 14, a second time-slot 44 for second ONT 16, and a third time-slot 46 for third ONT 18. Splitter 20 splits downstream TDM channel 40 into TDM channels 40' along multiple optical paths 22', 22", 22'". The splitting allows reception of downstream TDM channel 40 for ONTs 14, 16, 18. Each ONT 14, 16, 18 receives the entire downstream TDM channel 40, but is assigned a specific timeslot for data reception, as is known in the art (e.g., ONT 14 inspects time-slot 42, ONT 16 inspects time-slot 44, and ONT 18 inspects time-slot 46). By employing churning, each ONT 14, 16, 18 demodulates only the signals meant for it (i.e., inspects only the signals found within the assigned time slot). Additionally, amplifier 24 provides a downstream out-of-band signal 80 that communicates with ONTs 14, 16, 18 via optical paths 22, 22', 22", 22'". Amplifier 24 is typically an erbium-doped fiber amplifier (EDFA). Out-of-band signal 80 is used, among other things, to communicate with the components connected to communication system 10 as well as to provide a path for commanding a network component to take an action or to modify a behavior. Using out-of-band signal 80, a network component receives instructions from other components in communication system 10.

Each ONT is also assigned an upstream time-slot. First ONT 14 is assigned a first upstream time-slot 60, second ONT 16 is assigned a second upstream time-slot 62, and third ONT 18 is assigned a third upstream time-slot 64. The upstream time-slots 60, 62, 64 are combined by splitter 20 into a single upstream channel 70. Upstream channel 70 includes upstream data 72 in optical path 22. Further, each ONT 14, 16, 18 is synchronized to transmit within the time-slot assigned to it (e.g., first upstream time-slot 60, second upstream time-slot 62, third upstream time-slot 64) such that the data arrives at OLT 12 at the prescribed time.

Rogue ONT Interferes with Another ONT Time-Slot

Figure 3:
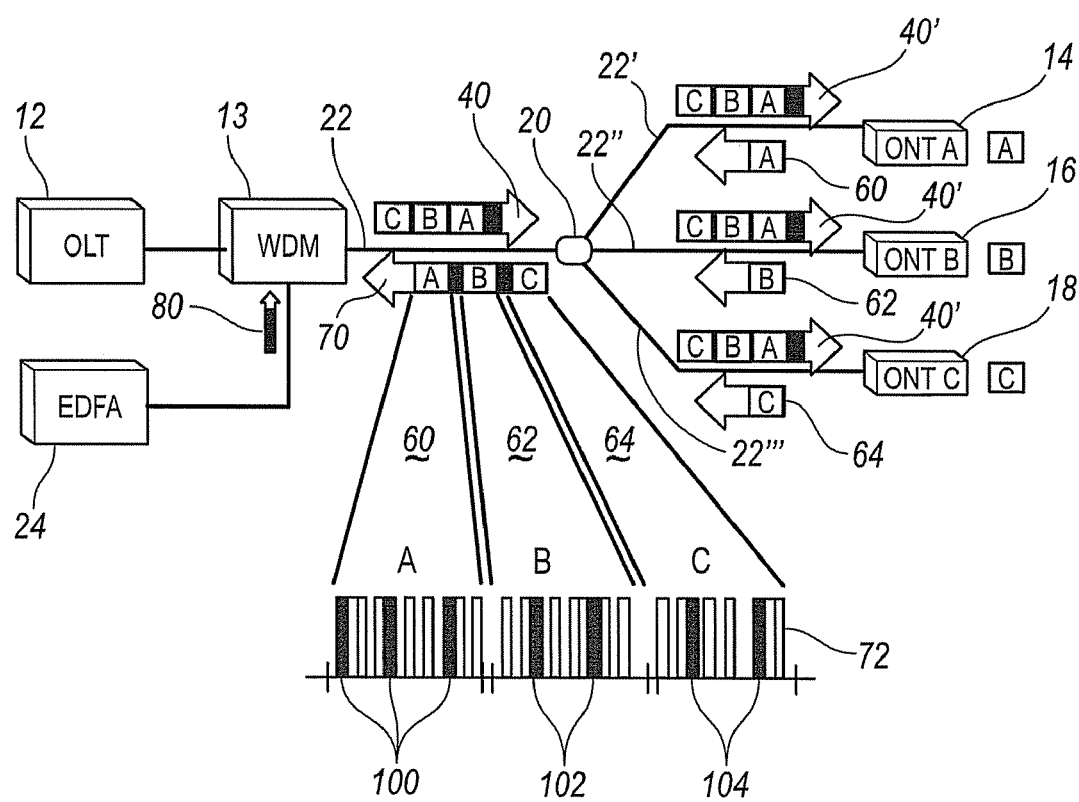
FIG. 3 illustrates a diagram showing an ONT using multiple ranging retries out of its assigned upstream time-slot and interfering with other ONTs, according to an embodiment.

FIG. 3 is a diagram showing first ONT 14 interfering with ONTs 16 and 18 where ONT 14 is using multiple ranging retries out of the assigned first upstream time-slot 60. Upstream time-slots 62, 64 may also be interfered with because of an underperforming connection (e.g., bad connector, underperforming optical path 22', or poor connection to splitter 20, or first ONT 14 is defective) associated with first ONT 14. In general, as the distance varies between ONTs 14, 16, 18, a ranging is performed such that delay times are inserted for the transmission of first upstream time-slot 60. Such a delay is typically necessary to prevent first ONT 14 from interfering with upstream time-slots 62, 64 for second ONT 16 and third ONT 18, respectively. The number of ranging retries and the effects of an underperforming connector may be the basis for deriving a performance metric for ONT 14 as well as PON 11.

To discover the delay for each ONT 14, 16, 18, OLT 12 issues a ranging grant to each ONT (individually) and waits for a response from the granted ONT. For example, to discover the delay time of ONT 14, the transmission time of the ranging signal from ONT 14 to OLT 12 and back to ONT 14 is measured. This time is then known to ONT 14 and is subtracted from the maximum optical path 22 length and becomes the transmit delay time for ONT 14.

In FIG. 3, first ONT 14 transmits a ranging signal 100 within first time-slot 60 in an attempt to detect a service from OLT 12. However, first ONT 14 also transmits errant ranging signals 102, 104 out of sequence in second time-slot 62 and third time-slot 64. Thus, the normal data transmissions of second time-slot 62 and third time-slot 64 for second ONT 16 and third ONT 18, respectively, are corrupted. That is to say, first ONT 14 transmits out of sequence and the data received by OLT 12 for ONTs 16, 18 are not properly received because the data integrity checks fail due to errant ranging signals 102, 104. Such data integrity check failures are considered malfunctions and are typically recorded as a performance metric of ONTs 14, 16, 18 and of communication system 10.

The multiple ranging operation is typically a malfunction when first ONT 14 cannot establish a service connection with OLT 12. In this case, first ONT 14 will continue to transmit ranging signal 100 within its own time-slot and the time-slots of other ONTs 16, 18. Such a malfunction can occur where first ONT 14 is defective, has an underperforming connector, an underperforming optical path 22', or is poorly connected to splitter 20 (e.g., fiber misalignment).

At least one solution to ensure appropriate communication system 10 performance is to provide a ranging limiting protocol to ONT 14. An appropriate protocol will effectively limit the number of ranging retries such that a maximum number of ranging signals are transmitted upstream before it is understood that there is a system problem. Further, it is possible to include a monitor process of ONT 14 (or agent) to detect undefined states such that upstream transmissions 60, 62, 64 are blocked when an undefined state is detected.

Figure 4:
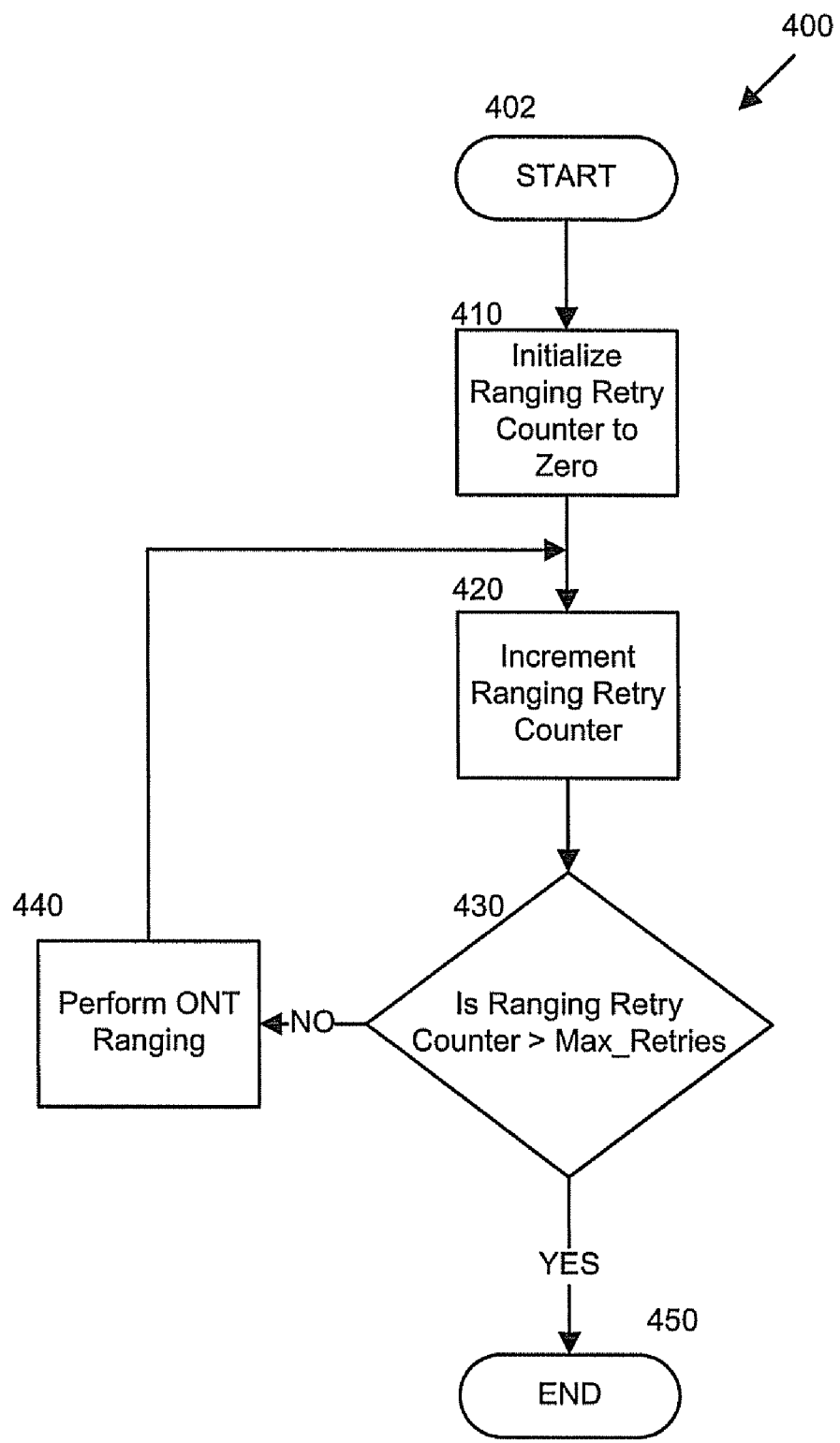
FIG. 4 illustrates a flow diagram of a ranging retry manager for an ONT of FIG. 3, according to an embodiment.

FIG. 4 is a flow diagram of a ranging retry manager 400 for ONT 14. The process begins at step 402 and control proceeds to step 410. At step 410, a ranging retry counter is reset to zero. The ranging retry counter counts the number of ranging signals that have been sent by ONT 14. Control then proceeds to step 420.

At step 420, a delay is performed and the ranging retry counter is incremented in anticipation of a ranging retry being transmitted. Control then proceeds to step 430.

At step 430, the ranging retry counter is compared with a Max_Retry value. The Max_Retry value represents the maximum number of retries that are to be sent by ONT 14 in normal operation (e.g., 10 retries are acceptable in a normal operational profile). If the number of ranging signals goes beyond Max_Retry, then it is assumed that there is a malfunction with ONT 14 or the connection path to OLT 12 is underperforming.

If the ranging retry counter is less than or equal to (<=) Max_Retry, then control proceeds to step 440. If the ranging retry counter is greater than (>) Max_Retry, then control proceeds to step 450 and the process ends.

In step 440, ONT 14 performs a ranging to determine the appropriate delay time such that upstream transmissions of ONT 14 fall within first upstream time-slot 60. Control then proceeds to step 420.

By controlling the maximum number of ranging retries for ONT 14, a possible disruption of upstream communications is avoided when ONT 14 may be defective or have underperforming connections to optical path 22. When the maximum number of ranging retries is reached, ONT 14 effectively goes off line for at least upstream communication 60 due to a detected error condition. Although ONT 14 is no longer communicating upstream, ONTs 16, 18 are capable of communication and are not subject to undesirable interference. Thus, communication system 10 is able to function without upstream communication 60 of ONT 14.

Figure 5:
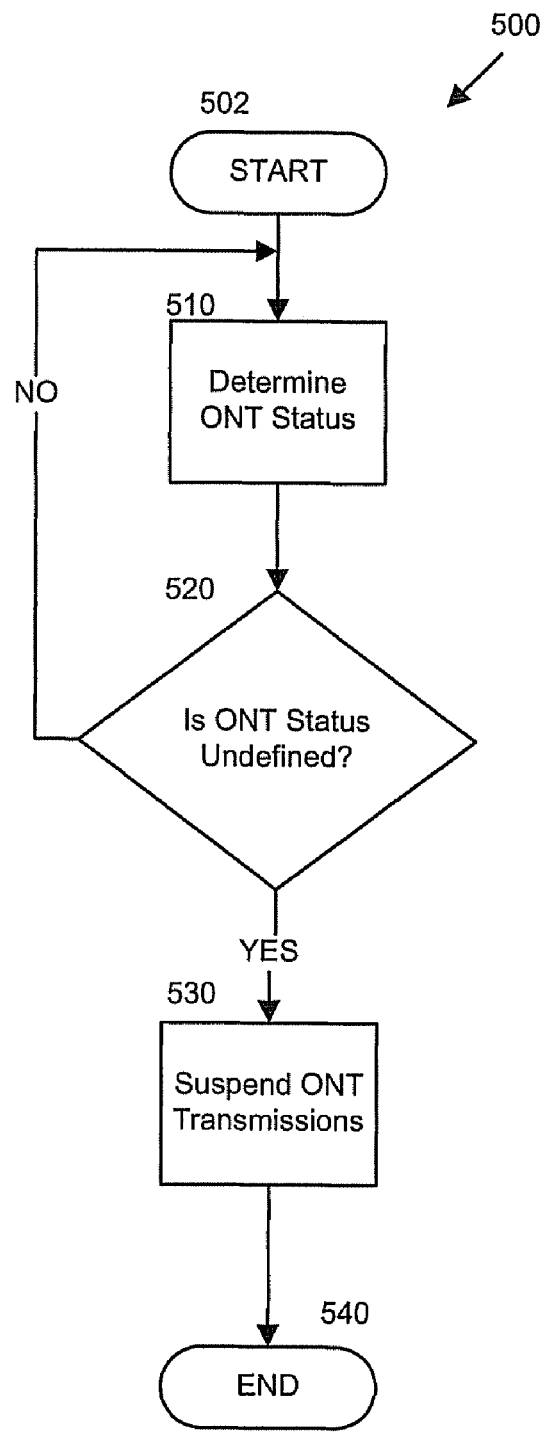
FIG. 5 illustrates a flow diagram of an undefined state manager for an ONT of FIG. 3, according to an embodiment.

FIG. 5 is a flow diagram of an undefined state manager 500 for ONT 14. The process begins at step 502 and control proceeds to step 510. In addition to the ranging retry counter above, ONT 14 may selectively monitor its own internal processes to detect possible malfunctions using an agent. These internal features may include software features, storage performance, throughput, and hardware status. At step 510, the status of ONT 14 is determined. This status check includes general diagnostics and monitoring of upstream transmission 70 activities. For example, if upstream transmissions are occurring where the delay value would place the transmission outside acceptable ranges, an undefined condition is detected. Control then proceeds to step 520.

At step 520, a check is performed to the status determined in step 510. An agent operating on ONT 14 monitors processes within ONT 14 and accumulates information relative to the performance of other processes. Essentially, the agent becomes an intelligent "watch dog" to determine if processes running on ONT 14 have a normal status or an undefined status (the undefined status, e.g., unknown state, being considered a malfunction). The agent, for example, determines whether certain processes have extended beyond their normal execution times (e.g., 10 ms is allowed for execution time in a normal operational profile). If so, the process is deemed to be operating in an undefined state because the process has overrun the allocated execution time. In another embodiment, the agent checks to see whether a status indicator is being updated by the process (the status indicator being updated by the process when self-diagnostics are OK and execution threads are timely handled). If an undefined condition is not detected, control proceeds to step 510. If an undefined condition is detected, control proceeds to step 530.

In step 530, ONT 14 suspends normal upstream transmission 60. Because an undefined condition has been detected, suspension is necessary in order to minimize interference with other ONTs 16, 18. ONT 14 then begins self diagnostics and performs a reset, the undefined status event being saved in memory so that a repeating-reset condition is detected and avoided. The process then ends at step 540.

Rogue ONT Overloads the PON

Figure 6A:
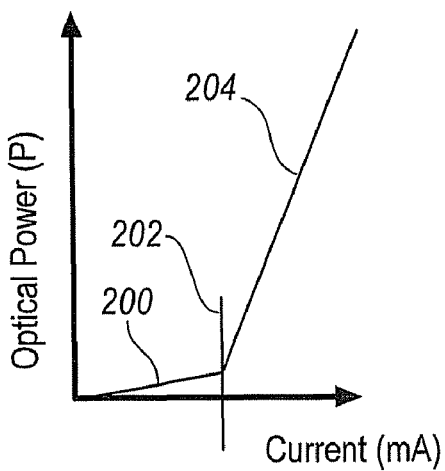
FIG. 6A illustrates a chart showing optical power vs. current for a laser, according to an embodiment.
Figure 6B:
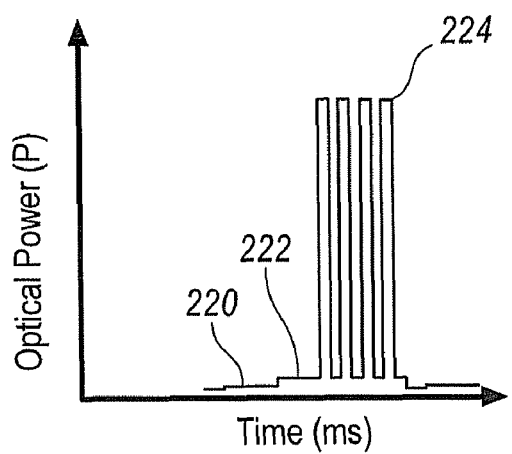
FIG. 6B illustrates a chart showing normal optical power vs. time for a bit stream within a time-slot, according to an embodiment.
Figure 6C:
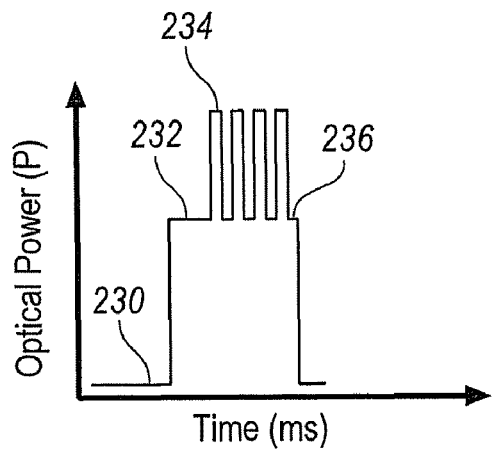
FIG. 6C illustrates a chart showing abnormal optical power vs. time for a bit stream within a time-slot, according to an embodiment.

An alternative failure mode of ONT 14 is where the laser (not shown) within ONT 14 transmits too much power when the laser is in the "off" mode. FIG. 6A-6C illustrate typical phases of an optical transmitting element (e.g., a Fabry-Perot laser) of ONTs 14, 16, 18. Where ONT 14 transmits too much optical power in the "off mode," such a condition is considered a malfunction as it reduces performance of PON 11. Such conditions and malfunctions are measurable as a performance metric of communication system 10.

FIG. 6A is a chart illustrating optical power vs. current for a laser. When current is applied to the laser, the operating region moves from the equivalent of a light emitting diode (LED) to a true laser. An off state 200 is where the laser optical power is very small. As more current is applied, a lasing threshold 202 is reached. Lasing threshold 202 is a point at which the laser is on the verge of transmitting and is assigned a value of logical "zero" of the transmitted signal. Beyond lasing threshold 202, more current will increase optical power transmitted in a lasing region 204. The large optical power transmitted in lasing region 204 is given a logical "one." In addition to off state 200, lasing threshold 202, and lasing region 204, other transition states and out-of-tolerance curves as described herein may cause error conditions.

FIG. 6B is a chart illustrating normal optical power vs. time for a bit stream within first time-slot 60. Over a period of time, a series of bits is transmitted from ONT 14 and is shown as a portion of first time-slot 60. An "off" value 220, a "zero" value 222, and a "one" value 224 is shown. When no current is provided to the laser, "off" value 220 is seen on optical path 22 as a de minimus optical power level. When the laser is at lasing threshold 202, an optical power output of logical "zero" 222 is seen on optical path 22. The optical power level of logical "zero" 222 is greater than "off" value 220 and is less than "one" value 224. When the laser is lasing, "one" value 224 is seen on optical path 22 at a level significantly greater than "zero" value 222.

The three-level process is desirable to allow for the use of low cost optics in ONT 14 (e.g., the use of Fabry-Perot lasers). The low cost lasers typically have a response time measured in milliseconds when in off state 200 and a response time measured in picoseconds when operating in lasing region 204. This means that the laser is capable of high rate transmissions when operating in lasing region 204 because the representation of data as optical power is capable of being represented faster than when changing from off state 200 to lasing region 204. Further, when operating the laser beginning from lasing threshold 202 and into lasing region 204, the laser outputs a narrow spectrum and reduces mode-partition noise as it travels through optical path 22.

FIG. 6C is a chart illustrating abnormal optical power vs. time for a bit stream within first time-slot 60. An off value 230, an abnormal logical "zero" 232, and a "one" value 234 are shown. Off value 230 is comparable to "off" value 220 of FIG. 6B. However, abnormal logical "zero" 232 optical power is significantly higher than the normal logical "zero" of FIG. 6B. Thus, the difference in optical power between abnormal logical "zero" 232 and "one" value 234 is significantly reduced from normal operating conditions described in FIG. 6B, abnormal logical "zero" 232 indicating a malfunctioning laser. Thus, when ONT 14 is introduced in communication system 10, OLT 12 will find it difficult or impossible to distinguish between abnormal logical "zero" 232 and "one" value 234 in first upstream time-slot 60. Where normal operation provides significant operating margin between logical "zero" 222 and "one" value 224 (see FIG. 6B), a defective laser or driver circuitry may degrade the margin between abnormal logical "zero" 232 and "one" value 234 (see FIG. 6C).

Further, when communication system 10 is configured with multiple ONTs 14, 16, 18, abnormal logical "zero" 232 is continuously apparent on optical path 22 and interferes with upstream transmissions 62 and 64, reducing the performance of communication system 10. Thus, when an abnormal laser remains active in ONT 14, upstream communications of ONTs 16 and 18 are interrupted or otherwise degraded by the abnormal optical power continuously present on optical path 22. Such a condition is monitored as a performance metric of the devices connected to, and communicating with, communication system 10. Additionally, the identification of the condition will reduce a health status (explained below in detail) of the device deemed to be causing a malfunction. Due to the serious nature of abnormal logical "zero" 232, an agent will typically act upon the determination and command a shutdown of the offending laser as a corrective action as an attempt to reduce disruption of communication system 10.

The health status is typically an indicator, or number, corresponding to the health of a component. A high number indicates a device that is operating normally (e.g., within a normal operational profile), and a low number indicates a device is not operating normally (e.g., is malfunctioning beyond an acceptable range as compared with a normal operational profile). The value of the health status may also indicate the severity of a problem and may be compared with thresholds to determine an action to take regarding the component. Alternatively, the health status is also embodied, in some cases, as having two states of "Normal" and "Abnormal." Depending upon the component, any embodiment of a status may be tailored.

Figure 7:
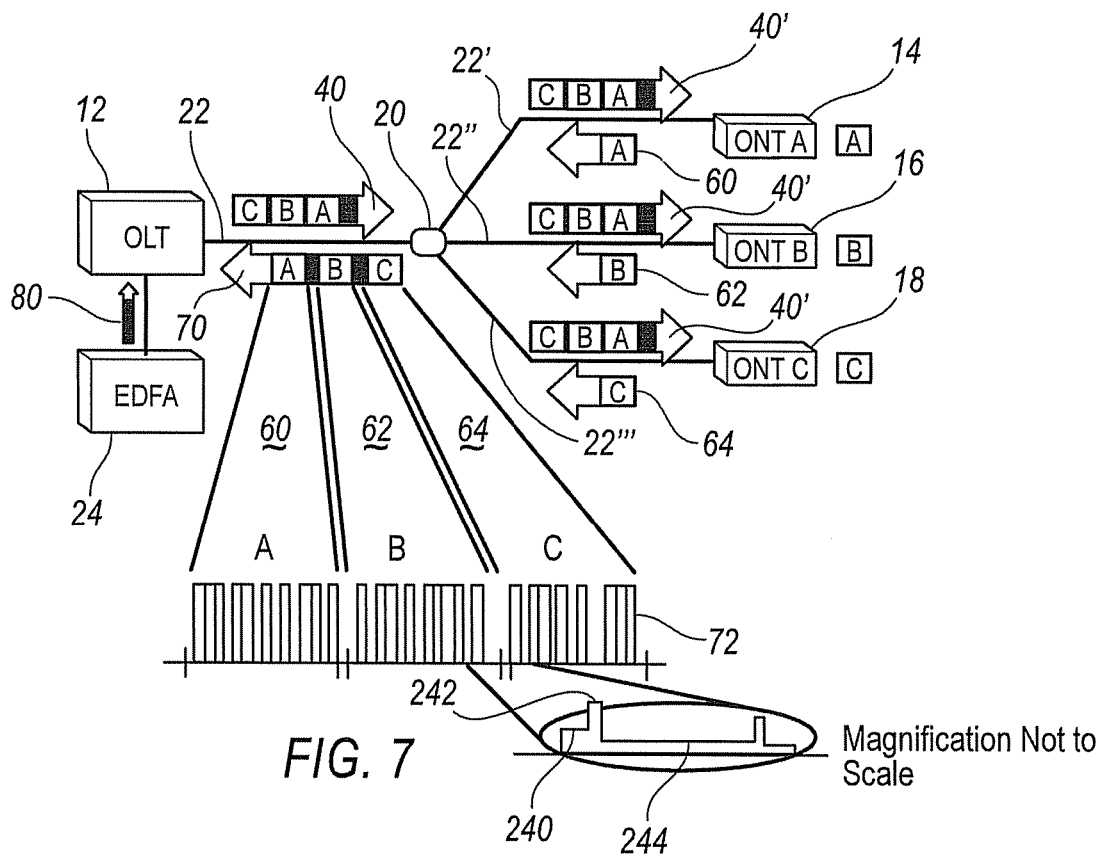
FIG. 7 illustrates a diagram showing an interference between adjacent time-slots, according to an embodiment.

FIG. 7 is a diagram showing an interference between second time-slot 62 and adjacent third time-slot 64. A logical "zero" level 240, a logical "one" level 242, and an "off" state 244 is shown. Here, second ONT 16 is assigned second upstream time-slot 62 and third ONT 18 is assigned third time-slot 64. In the time region between second time-slot 62 and adjacent third time-slot 64, second ONT 16 is to turn off its laser so that third ONT 18 is able to clearly communicate with OLT 12. However, "off" state 244 of second ONT 16 is not completely turned off such that optical power is emitted in third time-slot 64 that is reserved for third ONT 28.

The carry-over of optical power from one time-slot to another is called a "lasing tail" that is from the preceding time-slot, the "lasing tail" condition indicative of a malfunction. Thus, the desired signals of "ones" and "zeros" of third time-slot 64 are interfered with by the tail of second ONT 16 assigned the preceding second time-slot 62. The carry-over reduces the system performance of communication system 10 by introducing bit error rates (BER) and dropped packets. The degree of system performance degradation depends on the amount of optical power carried over from the neighboring time-slot of another ONT. The BER may also be monitored as a performance metric of communication system 10 and may be compared with an operational profile of expected BERs for a typical communication system 10. The comparison leading to the detection of a problem or possible rogue ONT 14.

Figure 8:
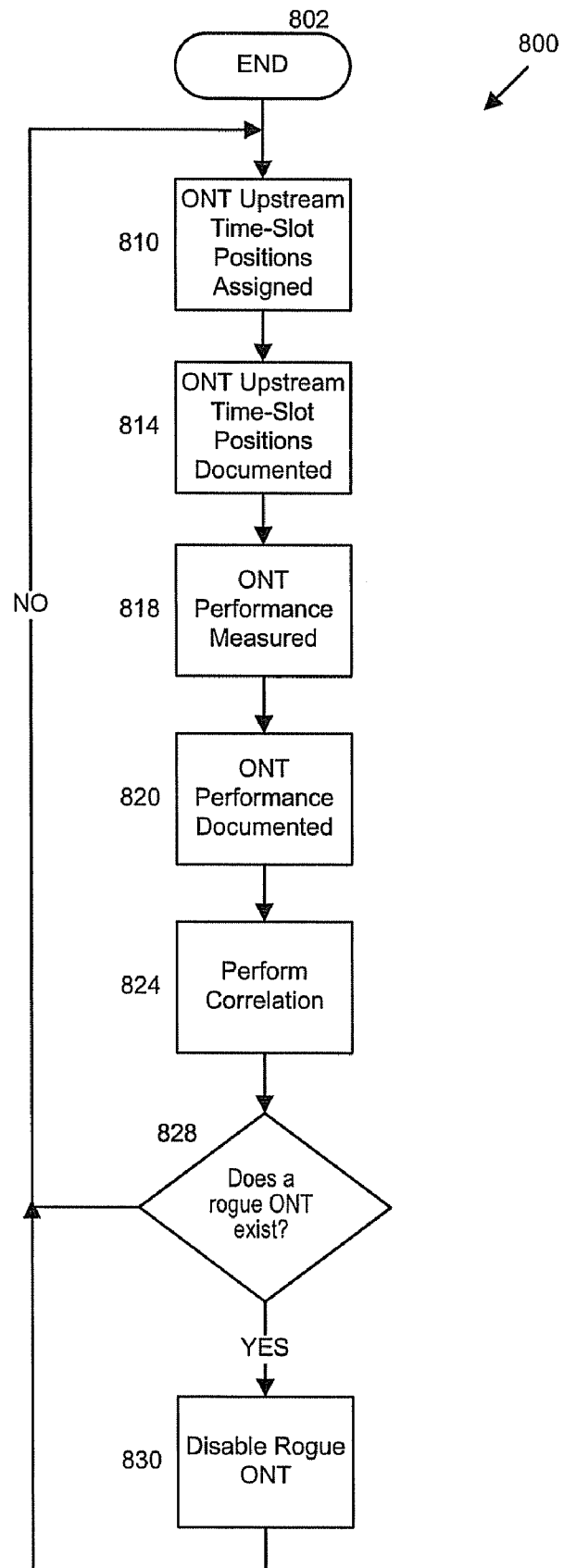
FIG. 8 illustrates a flow diagram for tracking interference between time-slots and disabling the offending ONT, according to an embodiment.

FIG. 8 is a flow diagram for neighboring interference correction system agent 800 that tracks interference between time-slots 60, 62, 64 and disables the offending ONT 14, 16, 18. Correction system agent 800 is embodied in whole, and alternatively in part, of elements of communication system 10. This may include OLT 12, each ONT, and an element management system (EMS). In general, OLT 12 provides the capability to reassign ONTs 14, 16, 18 to different time-slots 60, 62, 64. OLT 12 then tracks the performance of ONTs 14, 16, 18 and identifies by correlation of performance degradations with the assigned time-slot 60, 62, 64 position of ONTs 14, 16, 18, a possible rogue ONT that is interfering with communications by upstream channel 70 of the other ONTs. The process begins at step 802 and control transfers to step 810.

At step 810, the positions of ONTs 14, 16, 18 are assigned. The positions correspond to upstream time-slots 60, 62, 64. For example, first ONT 14 is assigned first time-slot 60, second ONT 16 is assigned second time-slot 62, and third ONT 18 is assigned third time-slot 64. However, process step 810 allows for the assignment of ONTs to any of the time-slots available. Further, agent 800 is not limited to the three ONTs 14, 16, 18 that are illustrated herein. It is known in the art that more ONTs may be assigned (typically 32) such that process step 810 has a choice of any of these time-slots to assign to the ONTs.

Additionally, as the ONT time-slot positions are tracked in step 814 below, the process does not typically assign the same time-slot to the same ONT over again. OLT 12 will assign the ONTs a time-slot to cover all permutations of ONTs and time slots in order to collect the best set of performance data (collected in step 820) to allow for the correlation of the ONT position with performance (described in detail with respect to step 820 below).

For example, assigning a variable A to first ONT 14, a B to second ONT 16, and a C to third ONT 18 provides the position relation to time-slots 60, 62, 64 as the time-slot position set of {ABC, ACB, BAC, BCA, CAB, CBA}. Thus, the performance of every adjacency of each ONT to another ONT may be measured. However, as discussed above, communication system 10 may include a large number of ONTs. Thus, it is possible to collect a sufficient set of performance measurements without exhausting the permutations of ONT positions relative to each other. Agent 800 may wait to take action until a statistically significant number of communications are analyzed. Control proceeds to step 814.

At step 814, the positions of each ONT are documented. Of importance are the adjacencies of the ONTs to each other in time (i.e., their order of transmission). For example, where first ONT is in a transmitting time-slot that is immediately before second ONT, this adjacency is used in the performance correlation step 824 below. Control then proceeds to step 818.

At step 818, the performance of each time-slot 60, 62, 64 is measured. Each time-slot is measured individually for performance including, but not limited to, BER and dropped packets. Such performance is measured by OLT 12 when a packet is received during a time-slot. Control then proceeds to step 820.

At step 820, the performance of each time-slot 60, 62, 64 is documented. Any errors measured in step 818 above are documented for further processing. Control then proceeds to step 824.

At step 824, a correlation function is performed between time-slots 60, 62, 64 and the assigned positions of ONTs 14, 16, 18. Because the time-slot assignment for each ONT is documented in step 814 and the performance of time-slots 60, 62, 64 are documented in step 820, the performance of an individual ONT is determined. For example, if a bit-error is associated with first time-slot 60, then an error indicator is assigned to the adjacent ONT having the time-slot preceding first time-slot 60 because of an assumed "lasing tail" error (described above in detail with respect to FIG. 7).

However, where an underperforming connector is causing errors, the ONT assigned the preceding time slot may not be a rogue ONT. Thus, an error is also assigned to the ONT occupying the time-slot where the error occurred. To differentiate between malfunctions of a "lasing tail" error, an underperforming connector, or the existence of both, it is necessary to collect errors related to the imputed ONT having the "lasing tail" error as adjacent to a non-error ONT and occupying an earlier time-slot. Thus, where an imputed "lasing tail" error ONT does not introduce errors into another time-slot with another ONT, it can be assumed that the imputed rogue ONT was incorrectly charged and is not a rogue ONT.

By switching the position of possible rogue ONTs, an actual "lasing tail" problem can be determined where the possible rogue ONT is causing bit errors in other time-slots. The underperforming connector issue is found where the ONT timeslot is continuously experiencing upstream errors even where the adjacent time slots have been assigned to other ONTs. To this end, the scheduling process in step 810 may use the correlated error information of step 824 to determine the most efficient position assignments for the ONTs in order to ferret out the number and type of errors an ONT may have. Each of these errors may then be used as performance metrics of the ONTs as well as communication system 10 overall.

Additionally, as more permutations of the ONT positions are assigned and errors tracked, the greater the statistical significance of the performance measurements correlated. That is to say, a single error associated with an ONT is not in and of itself significant. However, as more errors are attributed to an ONT with varying positions and adjacencies, there is greater confidence that an ONT is indeed a rogue ONT, or has the greater likelihood of becoming one in the future.

At step 828, after a predetermined number of time-slot positions are tested (considered statistically significant), for example a normal operational profile allows for two (2) "lasing tail" errors within an hour period, the correlated error information is tested to determine if a rogue ONT exists (e.g., do the number of errors exceed a normal operational profile?). Where a possible rogue ONT or an actual rogue ONT is found to be in the system, a log is made in storage of the determination and includes information about the fault and the ONT itself (e.g., "lasing tail" error and ONT serial number and location). In an embodiment, the correlation error information If a determination is made that there exists a rogue ONT, control proceeds to step 830. If no rogue ONT exists, control proceeds to step 810 for continued monitoring.

At step 830, the offending ONT is disabled. A transmission is sent from OLT 12 to the rogue ONT and is received by the rogue ONT. The rogue ONT decodes the message from OLT 12 and determines that it is being requested to remove itself from the network. Control then proceeds to step 830.

When commanded, the rogue ONT discontinues transmission and ceases powering (e.g., shuts down) its laser, effectively discontinuing access of the ONT to communication system 10. This provides that the rogue ONT will no longer interfere with the other ONTs of communication system 10. Additionally, OLT 12 logs the disabling of the rogue ONT for future servicing. In this way, a rogue ONT can be disabled without requiring physical disconnection. Further, the performance of communication system 10 is immediately improved without human intervention. This will reduce the amount of labor required to locate a fault as well as increase up-time and customer satisfaction for the network.

While the rogue ONT is not transmitting, it is desirable that the rogue ONT further listen to commands from OLT 12 such that rogue ONT may be required to perform self diagnostics, reset, or take corrective action. For example, if a self diagnostic is performed that allows for self-correction, the rogue ONT may begin transmitting again. Also, a reset of rogue ONT may solve the transmit problem. Again, corrective action, such as the recalibration of the ranging delay subsystem may be appropriate.

Once corrected, the rogue ONT may again begin transmission on its own or when commanded to by OLT 12. If the problem has not in fact been corrected, agent 800 and OLT 12 will further monitor the rogue ONT's activity and request a further cessation in transmission. As the actions of the rogue ONT are monitored by agent 800 and OLT 12, the corrective actions of the rogue ONT may not be effective. If further, and unacceptable, disruptions to communication system 10 continue to occur due to the rogue ONT, OLT 12 may send a message to the rogue ONT to permanently disable the transmit function or all functions.

Rogue ONT Dominates the PON

Another alternative failure mode of ONT 14 can be characterized in that a rogue ONT 14 dominates PON 11 and OLT 12. In this sense, rogue ONT 14 is transmitting too often, out of sequence of time slot 60, or is otherwise disrupting PON 11. However, monitoring of PON 11 by OLT 12 and by rogue ONT 14 itself allow for corrective action to be taken in order to restore PON 11 to normal operation.

Figure 9:
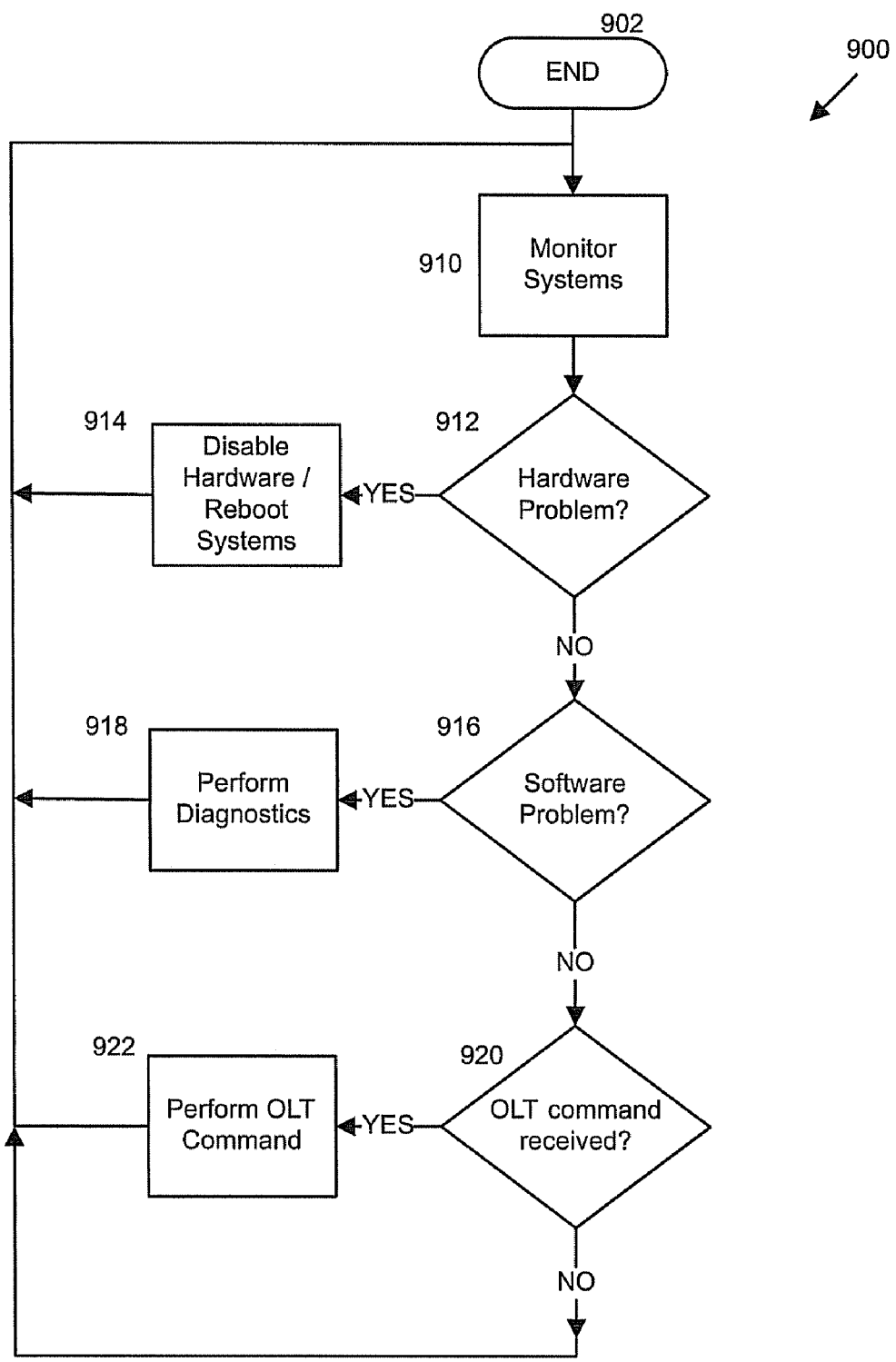
FIG. 9 illustrates an alternative embodiment of an agent that monitors and corrects the operation of a rogue ONT.

FIG. 9 illustrates a further embodiment of an agent 900 (similar to the agent explained in detail regarding FIG. 5) that monitors and modifies (corrects) the operation of rogue ONT 14. The process begins at step 902 and control proceeds to step 910.

At step 910, the status of various components of possible rogue ONT 14 is determined; for example, the status of hardware sub-components such as chip-level errors (e.g., laser error, interface chip errors, encryption errors), process timing overruns, and upstream time-slot 60, 62, 64 overruns. The status monitoring providing agent 900 with performance metrics of possible rogue ONT 14. Possible rogue ONT 14 also listens for commands sent from OLT 12 via a downstream TDM channel 40. In this way, OLT 12 may control the functionality of possible rogue ONT 14 (as described in detail with respect to FIG. 10). Additionally, any faults determined herein are logged in a retained memory so that faults causing a reset will be detected and prevented in a reset sequence for possible rogue ONT 14. Control then proceeds to step 912.

At step 912, ONT 14 determines whether a hardware problem is deemed to exist based on data collected in step 910. Hardware problems can be imputed where hardware malfunctions are detected in single instances or in a number of instances over a period of time (e.g., whether the number of malfunctions exceed a normal operational profile). The hardware malfunctions may be detected by ONT 14 itself or by other network components having the diagnostic capability. If a hardware problem is detected, control proceeds to step 914. Otherwise, control proceeds to step 916.

At step 914, ONT 14 disables hardware components (and the corresponding software processes) to prevent further disruption of communication on PON 11. Additionally, ONT 14 may take corrective action in order to bring ONT 14 back to a normal operating condition. For example, ONT 14 may shut down the laser (not shown) used for transmitting messages within an upstream time-slot 60, 62, 64 (see FIG. 2). Further, ONT 14 may reboot chips (not shown) under the control or embedded within ONT 14 in order to bring ONT 14 back to a normal operating condition. In this way, agent 900 modifies the operation of ONT 14 to reduce interference with other network components communicating on communication system 10. Control then proceeds to step 916.

At step 916, ONT 14 determines whether a software problem is deemed to exist based on data collected in step 910. For example, where a communications routine is not responding, or has not achieved the necessary throughput as described in a normal operational profile, the condition of a software problem is detected. If a software problem is deemed to exist, control proceeds to step 918. Otherwise, control proceeds to step 920.

At step 918, ONT 14 halts processes that are behaving outside of predetermined norms. For example, where a process is not responding (e.g., the process is executing an undefined/infinite loop) ONT 14 may "kill" (e.g., terminate) and restart the process. In this way, uncontrolled, abnormal, or otherwise undefined state processes are handled. Control them proceeds to step 920.

At step 920, ONT 14 determines whether a control message has been received (explained below in detail with respect to FIG. 10). The control message may be from OLT 12 as well as from an internal sub-component of ONT 14, or from another network component. The control message may command ONT 14 to turn off its laser, shut-down, disconnect from communicating via PON 11, etc. If a message has been received, control proceeds to step 922 where the message is handled. Otherwise, control proceeds to step 910 wherein agent 900 continues monitoring.

At step 922, ONT 14 handles OLT 12 control message. Because process 900 is essentially categorized as a diagnostic/fault recovery process, commands from OLT 12 are executed without discretion from ONT 14. That is to say, diagnostic-related messages from OLT 12 take priority to other actions of ONT 14. In this way, OLT 12 may issue a command to temporarily or permanently suspend operation of ONT 14 to avoid disruption on PON 1 where a fault related to ONT 14 cannot be corrected internally by ONT 14. Thus, where a command, for example, to discontinue operations is received by ONT 14, ONT 14 will take the necessary steps required to disable itself. Alternatively, where OLT 12 has only requested a reset, ONT 14 will reset and attempt to resume normal operations. Further, OLT 12 may command ONT 14 to perform other maintenance operations or transfer data (e.g., periodic reset, perform diagnostic tests, transmit information related to the "health" of components). In this way, OLT 12 may monitor ONTs 14, 16, 18 and transmit this diagnostic information to higher level network monitoring. Control then proceeds to step 910 wherein agent 900 continues monitoring.

Figure 10:
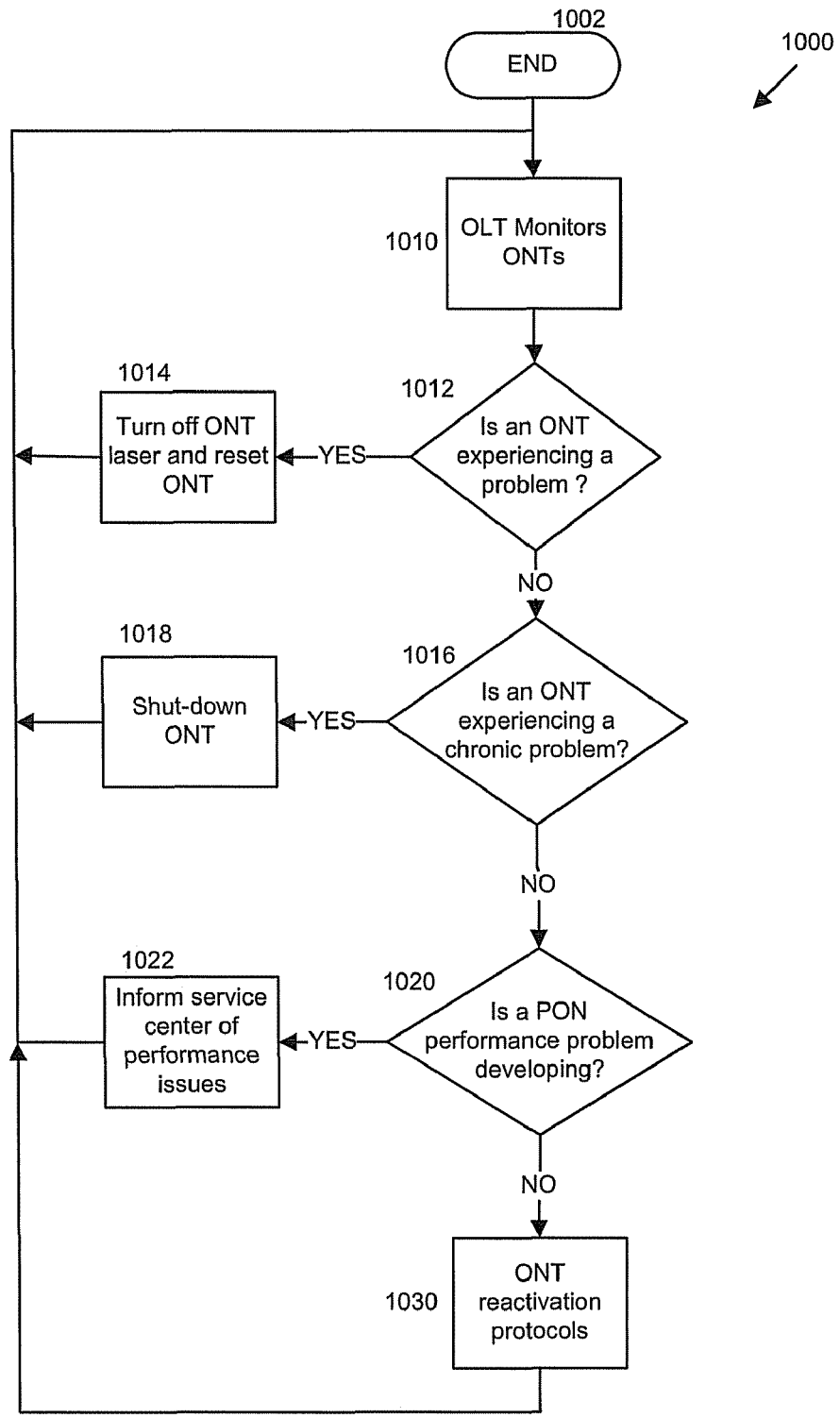
FIG. 10 illustrates an embodiment of an OLT agent that monitors and corrects the operation of a possible rogue ONT.

FIG. 10 illustrates an embodiment of an OLT agent 1000 that monitors and corrects the operation of a possible rogue ONT 14. In general, OLT agent 1000 (operating as a process within OLT 12) analyzes information related to possible rogue ONT 14 to determine whether action should be taken to control or disable ONT 14. OLT agent 1000 may then respond to distress on PON 11 and/or proactively control ONT 14 when a problematic condition is detected. The process begins at step 1002 and control proceeds to step 1010.

At step 1010, OLT 12 monitors ONT 14 and records performance information as well as alarm information related to ONT 14. For example, where ONT 14 is disturbing neighboring upstream time-slot 60, 62, 64 (see FIG. 3), OLT 12 records such an interaction. Further, OLT 12 monitors the reset activity, if any, of ONT 14 to determine whether ONT 14 is in a periodic reset condition. Alternatively, OLT 12 may monitor the sequence of alarms sent from ONT 14 to determine whether ONT 14 is in an undefined state. For example, a normal alarm sequence may be 1) "Battery Alarm," 2) "Power Alarm," and 3) "Dying Gasp Alarm." However, when ONT 14 is in an undefined state (see FIG. 9), an abnormal alarm sequence may be 1) "Dying Gasp Alarm," 2) "Power Alarm," and 3) "Battery Alarm." Thus, the sequence of the "Dying Gasp Alarm" and the "Power Alarm" are out of logical sequence. OLT 12 then logs the out-of-sequence alarm. Further, performance measurements may be recorded for each ONT 14, 16, 18 for determining if performance is degrading over time so that proactive steps may be taken to maintain PON 1. The process then proceeds to step 1012.

At step 1012, OLT 12 reviews the information collected and logged in steps 1010, 1014 and determines whether an ONT 14, 16, 18 is experiencing a problem. The determination of an ONT 14, 16, 18 problem can include a reset condition, out-of-sequence alarms, performance degradation, or disturbance of neighboring upstream time-slots 60, 62, 64 (see FIG. 3), etc. When OLT 12 determines through monitoring that ONT 14 has a problem based on operational profiles of ONTs 14, 16, 18, and other network components, control proceeds to step 1014. Otherwise, control proceeds to step 1016.

At step 1014, OLT 12 sends a command to reset the offending ONT 14, 16, 18. For example, where ONT 14 is a rogue ONT 14, OLT 12 issues a command via downstream TDM channel 40 to be received in the slot assigned to ONT 14. When received, ONT 14 will execute the command, in this case a reset (see FIG. 9). Further, OLT 12 logs the issuance of a reset command to ONT 14 where the use is described in detail with respect to step 1016. Although in this case OLT 12 issues a reset command to ONT 14, other commands may be sent allowing OLT 12 to further diagnose a possible malfunction of ONT 14. Control then proceeds to step 1016.

At step 1016, OLT 12 reviews the information collected and logged in steps 1010, 1014 and determines whether an ONT 14, 16, 18 is experiencing a chronic problem (i.e., rogue ONT 14 resets every 10 seconds or rogue ONT 14 is continuously interfering with neighboring upstream time-slots 60, 62, 64). If a chronic condition is detected, control proceeds to step 1018. Otherwise, control proceeds to step 1020.

At step 1018, rogue ONT 14 is deemed to have a chronic problem. In response, OLT 12 issues a command for rogue ONT 14 to shut down and also sends a message to a service center for communication system 10. The shut down action will immediately protect PON 11 from interference caused by the malfunction of ONT 14. Further, a user having access to ONT 14 is not inconvenienced because ONT 14 is already malfunctioning. Thus, the performance and reliability of PON 11 is increased while at the same time, rogue ONT 14 is singled out for maintenance as the service center for communication system 10 has been informed of the problem. Control then proceeds to step 1020.

At step 1020, OLT 12 determines if a performance problem is developing. OLT 12 may determine the performance problem based on historical information related to PON 11. For example, OLT 12 logs interference between neighboring upstream time-slots 60, 62, 64. Where an increase of interference occurs and continues to increase over time, OLT 12 infers that a performance problem is developing based on operational profiles of the network components. Further, where an ONT 14, 16, 18, experiences an increasing number of faults, or faults at a rate higher than a predetermined threshold, OLT 12 may deem the ONT 14, 16, 18 a menace to PON 11. Where a performance problem with PON 11 is deemed to exist, control proceeds to step 1022. Otherwise, control proceeds to step 1030.

At step 1022, OLT 12 informs a network manager (not shown) that PON 11 has decreasing performance. For example, OLT 12 informs the service center for communication system 10 that PON 11 is experiencing performance issues and that ONT 14 is most likely causing the performance degradation. Thus, the network may be preemptively serviced to avoid network outages or interruptions. Control proceeds to step 1030.

At step 1030, where ONT 14 has been shut down, ONT 14 may be sent a message to re-activate after a predetermined time. This allows OLT 12 to re-activate ONT 14 to verify if the error condition still exists. It also determines whether any corrective action is still required of the service center for communication system 10. In one example, a temporary overheating may cause ONT 14 to malfunction. The overheating may be due to excessive power inputs, a temporarily interrupted cooling system, etc. However, by allowing OLT 12 to re-activate ONT 14, the performance issue may have been temporary and service is no longer required. Thus, the cost of service has been reduced and a faster re-activation for users of ONT 14 is achieved. Of course, where a chronic problem still exists with ONT 14, the shutdown of step 1018 will likely occur again. Control proceeds to step 1010 where OLT agent 1000 continues monitoring.

Figure 11:
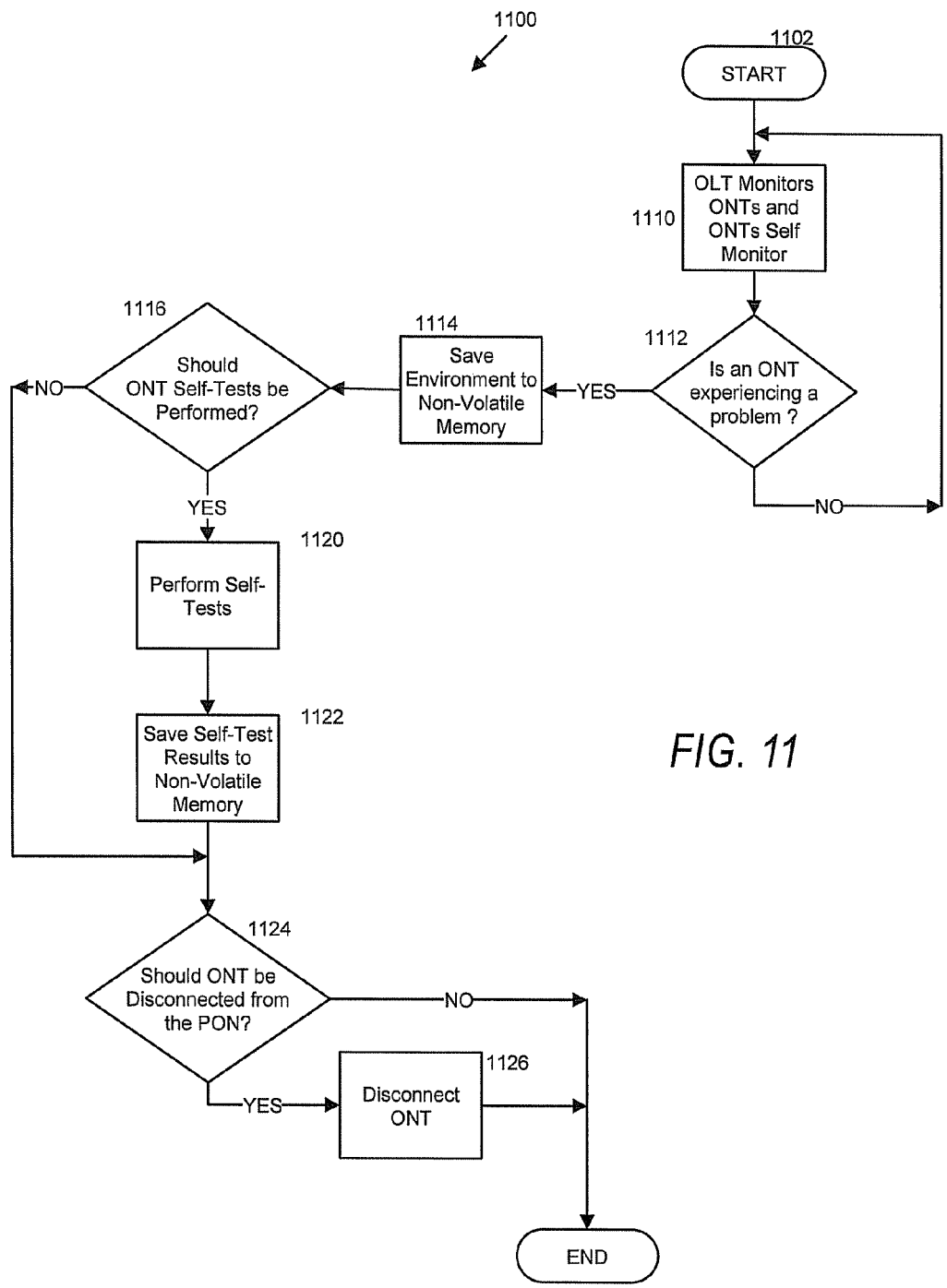
FIG. 11 illustrates a flow diagram of an ONT snapshot agent that saves current environment parameters to non-volatile memory.

FIG. 11 illustrates an embodiment of an ONT snapshot agent 1100 that saves current operating parameters, initiates self diagnostics, and saves self diagnostic results for later diagnosis and processing. In general, ONT snapshot agent 1100 (operating as a process within ONT 14) controls self diagnostic processes and is able to control the saving (or dumping) of memory as well as saving current operating parameters, and self-test results to non-volatile memory (e.g., flash memory, EEPROM, etc.). Typically, ONT snapshot agent 1100 determines that that ONT 14 is experiencing a problem based on error conditions or diagnostic results that indicate a problem (described in detail above). When a significant problem is detected, ONT snapshot agent 1100 may take a number of actions including the saving of critical data for later diagnosis, the running of additional self-test functions, and taking ONT 14 off-line when a condition is detected that may cause damage to ONT 14 or disrupt communications on PON 11. The process begins at step 1102 and control proceeds to step 1110.

At step 1110, OLT 12 monitors the performance of ONTs 14, 16, 18 (shown in FIG. 1) and ONTs 14, 16, 18 self monitor (see e.g., FIGS. 5 and 8). Control then proceeds to step 1112.

At step 1112, ONTs 14, 16, 18 individually determine whether they are experiencing a problem. That is to say, each ONTs 14, 16, 18 (or other ONTs not shown) makes a determination based on internal information, or a message received from OLT 12 that is also monitoring each of ONTs 14, 16, 18. OLT 12 may, for example, send a message to ONT 14, the message indicating that ONT 14 is experiencing a problem. In other embodiments, ONT 14 may determine an error condition based on alarms (such as the alarms described above with respect to steps 1010 and 1012 of FIG. 10). Additionally, ONT 14 may include a switch or pushbutton operable by a user to indicate that a problem exists and/or and for directly initiating the saving of data to non-volatile memory. If ONT 14 determines that it is experiencing a problem, control proceeds to step 1114. Otherwise, where no problem exists, control proceeds to step 1110 where monitoring continues.

At step 1114, ONT 14 saves the current environment to non-volatile memory. The environment may comprise alarms, state of the software modules, hardware status, battery conditions, wiring conditions, self check, etc. In this example, only ONT 14 has determined it is experiencing a problem. However, ONT snapshot agent 1100 may be present and operating on any ONT 14, 16, 18 or others. When the environment information is saved, a power interruption will not corrupt of erase the saved information. Thus, ONT 14 may be turned off, unplugged, and/or shipped to a diagnosis and repair facility without losing the environment information. Control proceeds to step 1116.

At step 1116, ONT 14 has completed saving the available environment information and must determine whether additional diagnostic tests are available and/or desired. For example, where a failure condition of ONT 14 is deemed to be related to a laser, diagnostics for the laser may be run (i.e., executed) in order to gather more information for later diagnosis. In another example, where a failure condition of ONT 14 is deemed to be related to a detector, diagnostics for the detector may be run in order to gather more information for later diagnosis. By tailoring diagnostic tests, more focused results may be presented for future diagnosis of an alleged problem. Moreover, highly focused tests may be run when appropriate. If additional diagnostic tests are available and desirable, control proceeds to step 1120. If no additional diagnostics are available or they are undesirable, control proceeds to step 1124.

At step 1120, additional testing and diagnostics are performed on the entire ONT 14 or on specific sub-components or systems. Based on the already-collected information or information obtained from OLT 12, ONT 14 may determine which tests are appropriate. In another embodiment, ONT 14 may use a predetermined statistical method to determine which tests are most relevant. In yet another embodiment, ONT 14 may have enough non-volatile memory to perform all self-tests. In this case, all self-tests may be performed. Control proceeds to step 1122.

At step 1122, ONT 14 saves the results of the additional diagnostic tests performed at step 1120 to non-volatile memory. Control proceeds to step 1124.

At step 1124, ONT 14 decides whether or not to disconnect from PON 11. The disconnection decision may be based on a message received from OLT 12, or it may be based on the environment data, diagnostic results, or other data. If ONT 14 determines that a serious fault has occurred that may be recurrent, or at least makes disruption of PON 11 possible, control proceeds to step 1126. If disconnection is not required, the process ends.

At step 1126, ONT 14 disconnects from PON 11 to avoid disruption of communications with ONTs 16, 18 and OLT 12. The process then ends.

Figure 12:
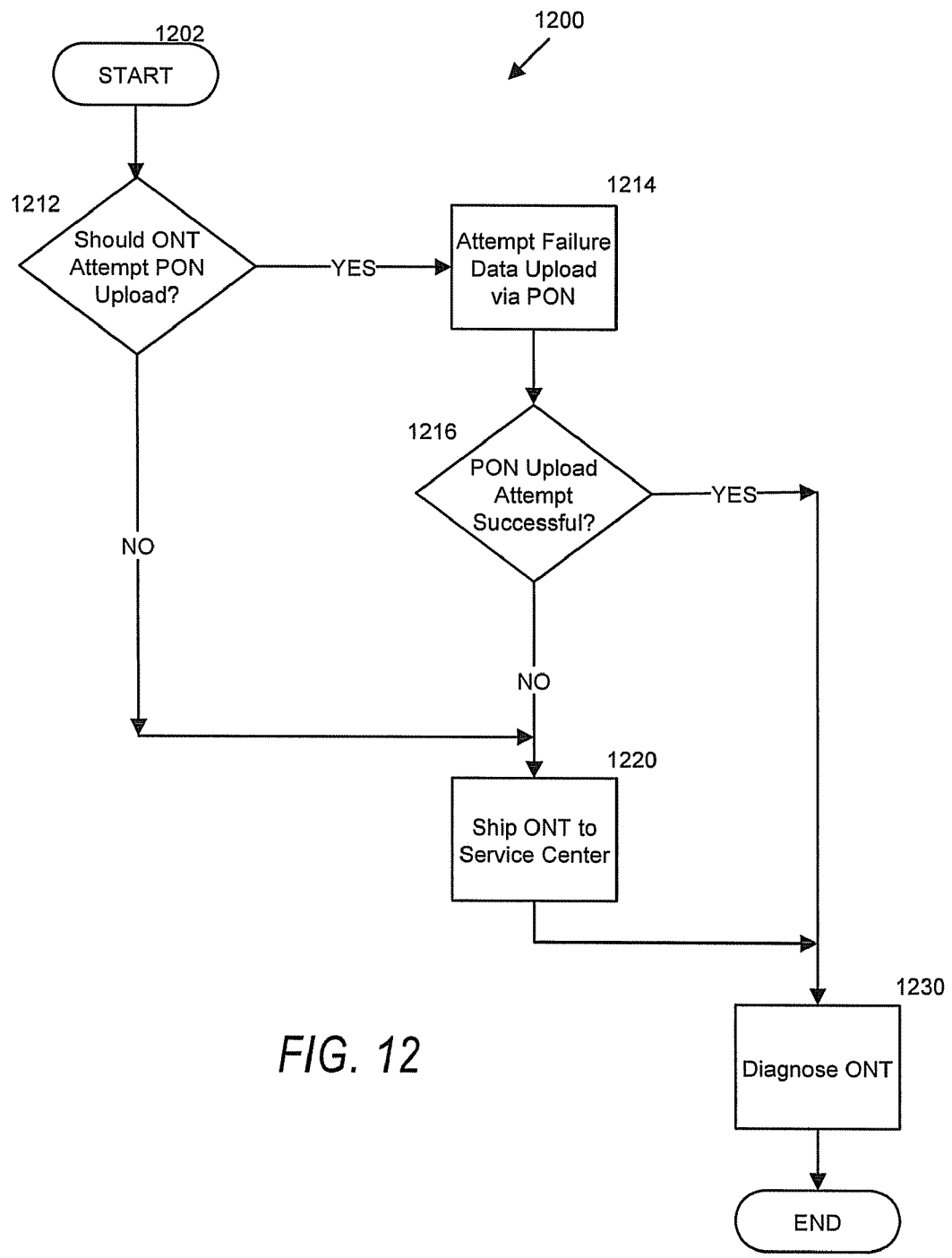
FIG. 12 illustrates a flow diagram for a method of delivering the saved diagnostic and/or environment parameters stored to non-volatile memory according to the embodiment of FIG. 11.

FIG. 12 illustrates a flow diagram for a method 1200 of delivering the saved diagnostic and/or environment parameters (e.g., operating parameters) stored to non-volatile memory (according to the embodiment of FIG. 11) for review. The process begins at step 1202 and control proceeds to step 1210.

At step 1212, ONT 14 determines whether an upload over PON 11 is required, viable, and desirable. For example, when ONT 14 determines there is a problem with receiving downstream communications on PON 11, such an error condition does not necessarily mean a transmission from ONT 14 is impossible or would even distrupt PON 11. In this case, ONT 14 may determine an upload should be attempted. However, when ONT 14 deems there is a problem with transmission, no such upload is attempted because other ONTs 16, 18 may be disrupted. Moreover, where a minor internal problem exists with ONT 14, upload of all information may be deemed appropriate and diagnostic adjustments may be determined by a supervisory system that analyzes the saved data from process 1100. If an upload of data is desired, control proceeds to step 1214. If no upload is desired, control proceeds to step 1120.

At step 1214, ONT 14 sends the failure and/or diagnostic information upstream on PON 11. OLT 12 may receive the data or OLT 12 may retransmit the data to a diagnostic subsystem that services PON 11. Control proceeds to step 1214.

At step 1216, it is determined whether an upload using PON 11 was successful. A successful upload may be determined based, for example, on a message from OLT 12 indicating a complete reception. Control proceeds to step 1230.

At step 1220, ONT 14 is removed from PON 11 and shipped to a service center for testing. Control proceeds to step 1230.

At step 1230, ONT 14 is diagnosed by reviewing the saved data either at a service center (where ONT 14 is physically shipped) or remotely using data uploaded from step 1214. The environmental and diagnostic data saved from processes 1100 and 1200 are used to determined the root cause of the failure or alleged failure. Other systems or diagnostics may be used to determine a cause for the fault of ONT 14, or to determine an operating adjustment for ONT 14 that may alleviate the problem. The process then ends.

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain embodiments and should in no way be construed to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A method comprising:
monitoring at least one performance metric of at least one network component in an optical network system;
determining, in an optical line terminal, whether said at least one network component is a rogue network component using said at least one performance metric;
saving environment data of said rogue network component to a non-volatile storage medium;
performing at least one self-diagnostic routine on a specific sub-component of said rogue network component based on said saved environment data; and
modifying the operation of said rogue network component to reduce interference of said rogue network component with said optical network system.

2. The method of claim 1, wherein said monitoring occurs via said optical network system.

3. The method of claim 1, further comprising:
saving a result generated by said at least one self-diagnostic routine to said non-volatile storage medium.

4. The method of claim 1, wherein said at least one performance metric is directed to activity on said optical network system of said at least one network component.

5. The method of claim 1, wherein determining further comprises comparing said at least one performance metric with a predetermined operational profile of said at least one network component.

6. The method of claim 1, wherein monitoring further comprises counting ranging attempts of said at least one network component.

7. The method of claim 1, wherein modifying further comprises:
commanding said rogue network component to discontinue accessing said optical network system, said rogue network component responding to said commanding by discontinuing accessing said optical network system.

8. The method of claim 1, wherein modifying further comprises commanding said rogue network component to shut down.

9. The method of claim 1, further comprising positioning a communication of said at least one network component in a plurality of time-slots of said optical network system.

10. The method of claim 1, wherein said at least one performance metric is selected from the group comprising: an optical power overload of said optical network system, a lasing tail of said rogue network component, said rogue network component interfering with said optical network system, a predetermined number of ranging retries of said rogue network component, and an undefined operational state of said rogue network component.

11. The method of claim 1, further comprising:
determining a type of error of said rogue network component.

12. The method of claim 1, wherein said environment data comprises a status for a hardware or software component.

13. A system comprising:
an agent operably connected to an optical network system;
at least one network component connected to said optical network system;
a communication channel operably connecting said agent and said at least one network component, wherein said agent identifies a malfunction of said at least one network component via said optical network system, and said agent uses said communication channel to command said at least one network component to initiate a corrective action when a malfunction is identified;
a non-volatile storage medium; and
a trigger initiating storage of environment data of said at least one network component to said non-volatile storage medium, wherein said agent performs at least one self-diagnostic routine on a specific sub-component of said network component based on said environment data.

14. The system of claim 13, wherein said command attempts to reduce disruption of said optical network system by said at least one network component.

15. The system of claim 13, wherein said communication channel comprises a time division multiplexing scheme.

16. The system of claim 15, further comprising a plurality of network components and wherein said agent commands said plurality of network components to occupy a plurality of time-slots of said time division multiplexing scheme.

17. The system of claim 16, wherein said agent uses said occupation of said plurality of time-slots to determine said malfunction.

18. The system of claim 13, wherein identifying said malfunction further comprises said agent receiving a statistically significant number of communications from said at least one network component.

19. The system of claim 13, wherein said environment data comprises a status for a hardware or software component.

20. The system of claim 13, wherein said agent saves a result generated by said at least one self-diagnostic routine to said non-volatile storage medium for future diagnosis of said at least one network component.

21. A method comprising:
detecting a condition of a network component in an optical network system;
triggering storage of environment data of said network component to a non-volatile storage medium;
performing, in an optical network terminal, at least one self-diagnostic routine on a specific sub-component of said network component in response to said environment data, wherein said self-diagnostic routine has a result; and
saving said result to said non-volatile storage medium.

22. The method of claim 21, wherein said network component is an optical network terminal.

23. The method of claim 21, wherein said environment data comprises a status for a hardware or software component.

24. The method of claim 21, wherein said condition comprises the performance of said network component on said optical network system.

25. The method of claim 21, wherein said network component takes an action based on said condition.

* * * * *